Patented Jan. 4, 1938

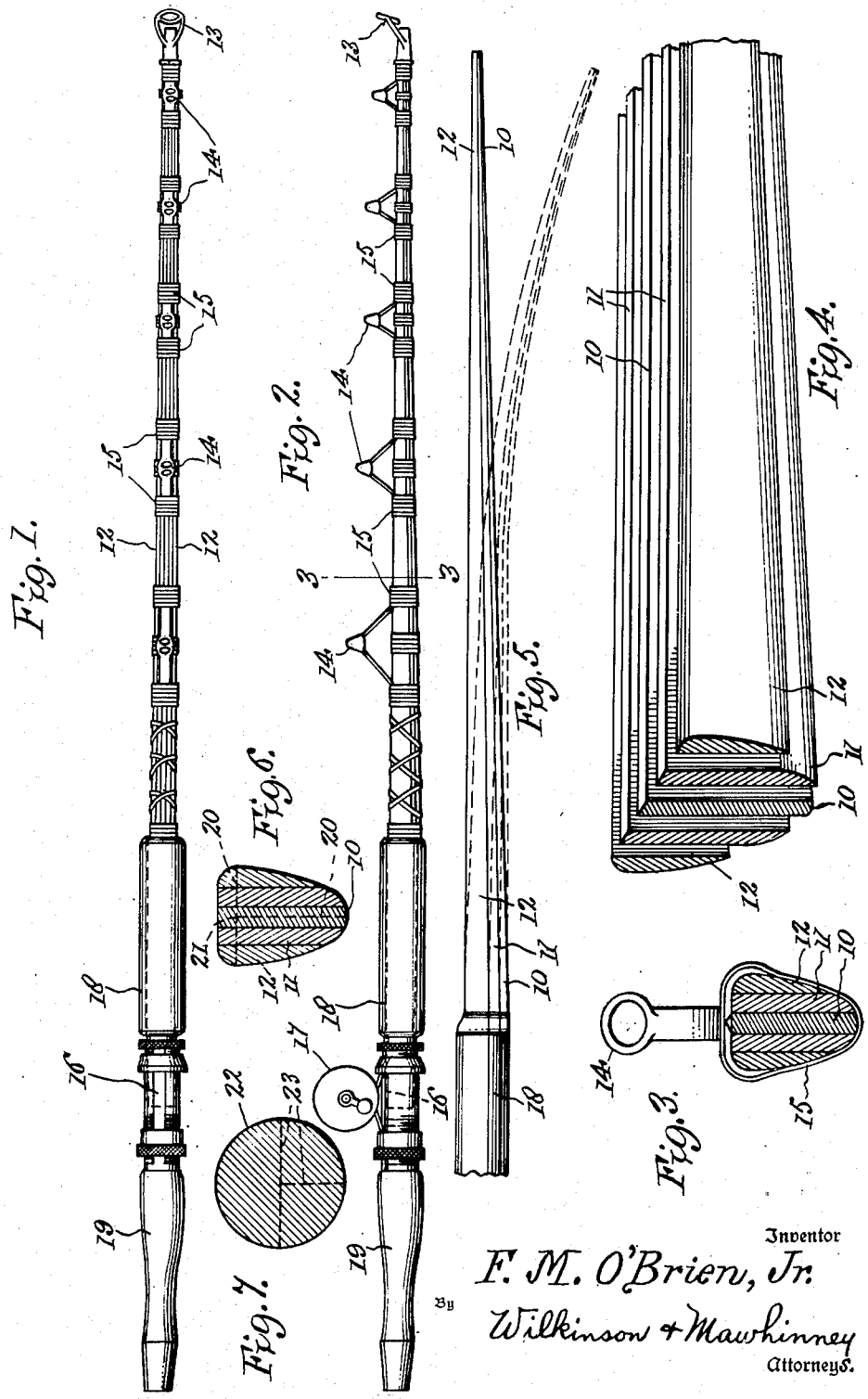

2,104,494

UNITED STATES PATENT OFFICE 2,104,494

LAMINATED FISHING ROD

Francis M. O'Brien, Jr., Miami, Fla.

Application October 28, 1936, Serial No. 108,103

10 Claims. (Cl. 43—18)

The present invention relates to fishing rods.

An object of the invention is to provide a novel construction of rod which has greater strength and elasticity and a greater inherent tendency to return to normal straight line position after flexing than all other prior rod constructions.

Another object of the invention is to provide a rod of novel and peculiar cross-sectional configuration to dispose the fulcrum or median line of stress and strain adjacent the upper surface or back of the rod so that the rod may resist bending or flexing under load by a greater compression than a tension strain, and wherein the tapering of the rod is wholly from the bottom and sides thereof to successively bring into play the consecutively shorter fibres of the rod as the flexing progresses and to thus reinforce and strengthen the rod proportionately to the load imposed on its outer end; such as through the fishing line carried by the rod particularly in handling, and landing large game fish.

A further object of the invention is to construct a fishing or other rod, of laminations of different woods or materials with the laminations lying in planes normal to the back of the rod and at right angles to the general plane of flexing of the rod so that there will be an edgewise resistance of the laminations to the bending or flexing action and a consequent increased strength and resistance to bending of the rod as compared to prior types of rods, particularly where the laminations are parallel to the plane of the back of the rod. The different woods and materials affording toughness and strength, flexibility and recuperative or rebounding qualities to the rod and wherein the rod also has the shock absorbing character essential in the handling of heavy and game fish.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a top edge or back view of a fishing pole embodying the structural features of the present invention.

Figure 2 is a side elevation of the same.

Figure 3 is a transverse section, enlarged, taken on the line 3—3 of Figure 2 through the pole.

Figure 4 is a fragmentary sectional view of the component laminations of the pole spaced apart in thin relative order.

Figure 5 is a detail side elevation of the pole body, the dotted lines showing the flexed position thereof when under load.

Figure 6 is a transverse section taken through the pole body, showing the substantially heart shaped cross section, the broken lines showing the relatively high median line of strain, and Figure 7 is a like view of the conventional round pole showing the relative position of the median line of strain at the center of the round pole.

Referring now to the drawing the body of the pole is constructed of a plurality of vertically disposed laminations 10, 11 and 12 with the laminations disposed at right angles to the top or back of the pole. These laminations have their back edges disposed in substantially a common transverse plane lengthwise of the pole as clearly shown in Figures 4 and 6. The laminations are of different materials for obtaining different effects of strength and resiliency and are so relatively disposed as to obtain the best results in the peculiar selection and disposition of the different materials of which the laminations are constructed. The lamination 10 is the central lamination and may be slightly thicker than the laterally disposed laminations, and is preferably made of hickory wood. The hickory wood imparts toughness and strength to the pole body. At opposite sides of the middle lamination 10 of hickory, are disposed laminations 11 of snakewood which imparts flexibility to the rod, and by disposing the flexible snakewood laminations against the strong and tough hickory lamination, the snakewood is well supported and combines with the hickory to impart the desired strength and flexibility to the pole body.

Against the outer sides of the laminations 11 are disposed the outer laminations 12 of bamboo which possesses relatively high recuperative characteristics so that the bamboo while being readily flexible with the snakewood assists in returning the snakewood laminations 11 and the hickory laminations 10 to their normal straight line positions to impart a longer life to the fishing pole without its setting or remaining in a bent condition in the direction of flexing under load.

It will be noted that all of the laminations 10, 11 and 12 are normal to the plane of the back of the rod so that the laminations will offer resistance to bending in an edgewise direction. This provides a rod body which has great resistance to bending, is very strong and is thus well adapted for use in handling heavy loads, particularly when the fishing rod is used for catching and landing large game fish.

Another important structural characteristic of the rod of this invention is that the tapering of the rod from butt to tip takes place at the bottom and sides of the rod rather than at the top or back thereof. The tapering is uniform at opposite sides and the bottom throughout the length of the rod so that the lengthwise extending fibers of the rod gradually taper out to thin lines or points at successively advanced or stepped points throughout the length of the rod toward the tip. This is shown in Figure 5 wherein the lower edges of the laminations 10, 11 and 12 are shown as converging upwardly toward the back of the rod and consequently the rod in flexing under load, as shown in dotted lines in Figure 5, will gradually and consecutively pick up or bring into play successively the shortened lower portions of the rod so as to increase its resistance to bending as the rod is flexed. This increases the strength of the rod proportionately to the load imposed upon it so that the rod is capable of flexing toward its tip under light loads and is capable of withstanding heavy strain when larger loads are imposed on the rod.

The rod or pole body may be built into a fishing pole of any suitable construction, and as shown the pole body is provided with a tip guide 13 and with a plurality of spaced apart line guides 14 disposed at desired intervals throughout the length of the pole and which may be secured to the pole by windings or wrappings 15 of waxed cord or the like. The butt end of the pole is provided with a reel seat 16 on which is mounted a reel 17, and the rod also has handle or grip sections 18 and 19 disposed above and below the reel seat 16 as shown in Figure 2.

The general configuration of the rod in cross section is heart shape, as shown in Figures 3 and 6. As shown by the dotted lines 20 in Figure 6 the center of strain indicated at 21 is disposed toward the top or back of the rod so that in flexing downwardly, the rod has a greater portion of it subjected to the strain of compression below the median strain line 21 and only a relatively small body portion above the median line 21 which is subjected to the strain of tension. The rod is thus relatively strong as the lower part thereof is placed under compression by the flexing of the rod and consequently is capable of carrying a heavy load. The hickory lamination gives greater toughness and strength to the rod while the laminations 11 and 12 provide the necessary additional strength and flexibility to the rod as well as the characteristic of returning to its normal straight line position as soon as the rod is relieved of the load imposed on it.

In Figure 7 there is shown comparatively a round rod 22 of conventional form and this figure also shows at 23 the centrally disposed line of strain wherein the upper half of the rod is subjected to tension and the lower half to compression. The larger the portion of the rod subjected to compression, the stronger is the rod and consequently the round rod cannot support as great a load as can the heart shaped rod shown in Figure 6. The guides 14 are of course secured along the back or top edge of the rod as clearly shown in Figures 2 and 3 so that the guides 14 are held from turning or twisting on the rod and are also maintained in line.

The rod thus constructed has the laminations disposed vertically to resist in an edgewise direction flexing of the rod under weight and the body portion of the rod is tapered from butt to tip and from the bottom and sides toward the plane of the back or top of the rod. These features, particularly when combined provide a very strong flexible rod which will maintain its straight line condition for a long time and provides a rod which is capable of use with heavy large game fish.

It is obvious that various changes and modifications may be made in the details of construction and design of the above specifically described embodiment of this invention without departing from the spirit thereof, such changes and modifications being restricted only by the scope of the following claims.

What is claimed is:

1. A fishing pole comprising vertically disposed laminations with a central lamination of hickory wood to impart toughness and strength to the pole, laminations of snakewood secured against the opposite sides of the lamination of hickory wood to provide flexibility for the pole, and outer lateral laminations of bamboo for imparting recuperative characteristics to the pole for returning the same to normal straight line position after flexing.

2. A fishing pole comprising a plurality of laminations of hickory, snakewood and bamboo disposed vertically in the pole to resist edgewise bending when the pole is flexed, said laminations having upper edges disposed in substantially a common plane to provide a flat back for the fishing pole and being tapered at their lower edges and sides from the butt to the tip of the pole to impart the desired tapering of the pole toward its tip and to maintain said back in a common plane.

3. A laminated fishing rod wherein the central lamination is a material having toughness and tensile strength, and laminations of snakewood secured to opposite faces of the central lamination.

4. A sporting implement consisting of a central section of a tough and strong material, and adhesively attached strips of snakewood on opposite faces of the central section.

5. A sporting implement comprising at least one lamination of snakewood and at least one lamination of a material having toughness and tensile strength closely adjacent and reinforcingly secured to one or more faces of the snakewood lamination.

6. A laminated fishing rod consisting of a plurality of laminated strips adhesively secured together to form a substantially triangularly shaped member in transverse section with one flat side forming the top of the rod, said strips gradually decreasing in size from the reel seat to the tip of the rod, and guide members upstanding from the top of the rod.

7. A laminated fishing rod, comprising a plurality of strips secured together in laminated order and extending in an edgewise direction from a common plane providing the upper side of the rod to the lower side of the rod, said rod having a transverse cross sectional construction with a transverse axis near its upper side less than the axis between said upper side and the lower side of the rod, and with its lateral sides tapering and rounded from said upper side to the said lower side of the rod and with the laminations beveled and rounded to conform to the cross sectional area of the rod, said rod having its lateral and bottom sides gradually reduced to taper the rod from its reel seat to its tip and maintain the upper edges of the laminations in said plane of the upper side of the rod, whereby upon flexing of the rod to bring the consecutively shortened fibers of the laminations into play for gradually taking up the load imposed on the tip of the rod.

8. A sporting implement having length and width irregular in cross-section of substantially parabolic form, consisting of a series of strips of material having high tensile strength, resiliency and flexibility, the strips being in parallel relation and including not less than two end strips and one intermediate strip, each strip extending the full length vertically from one wall surface to another wall surface, the side walls of all of the strips intermediate the inner walls of the outer strips being flat, said intermediate strip having an inherently higher tensile strength than the other strips and having both edges thereof cut at substantially right angles to the faces thereof.

9. A sporting implement having length and width irregular in cross-section of substantially trapezoidal form, consisting of a series of strips of material having high tensile strength, resiliency and flexibility, said strips being in parallel relation and including not less than two end strips and one intermediate strip, each strip extending the full length vertically from one wall surface to another wall surface, the side walls of all of said strips intermediate the end walls of the outer strips being flat, said intermediate strip having an inherently higher tensile strength than the other strips and being of greater width than the other strips and having both edges thereof cut substantially at right angles to the faces thereof.

10. A sporting implement having length and width irregular in cross-section of substantially triangular form, consisting of a series of strips of material having high tensile strength, resiliency and flexibility, said strips being in parallel relation and including not less than two end strips and one intermediate strip, each strip extending the full length vertically from one wall surface to another wall surface, the side walls of all of said strips intermediate the outer strips being flat, said intermediate strip having an inherently higher tensile strength than the other strips and being of greater width than the other strips and having both edges thereof cut substantially at right angles to the faces thereof.

FRANCIS M. O'BRIEN, Jr.